United States Patent

Moriyasu

[15] 3,643,234

[45] Feb. 15, 1972

[54] READ-ONLY MEMORY EMPLOYING STRIPLINES

[72] Inventor: Hiro Moriyasu, Portland, Oreg.

[73] Assignee: Tektronix, Inc., Beaverton, Oreg.

[22] Filed: Mar. 2, 1970

[21] Appl. No.: 15,568

[52] U.S. Cl. ........ 340/173 SP

[51] Int. Cl. ........ G11c 17/00

[58] Field of Search ........ 340/173 SP; 235/61.11 H; 333/81 A, 84 M

[56] References Cited

UNITED STATES PATENTS

| | | | |
|---|---|---|---|
| 3,003,143 | 10/1961 | Beurrier | 340/173 SP X |
| 3,159,820 | 12/1964 | Oden | 235/61.11 H X |
| 3,376,559 | 4/1968 | Yamato | 235/61.11 H X |

*Primary Examiner*—Eugene G. Botz
*Assistant Examiner*—R. Stephen Dildine, Jr.
*Attorney*—Buckhorn, Blore, Klarquist and Sparkman

[57] ABSTRACT

A read-only memory apparatus is described employing a plurality of stripline-type transmission lines. The input and output transmission lines are formed by signal conductors provided on the opposite sides of a common ground plane conductor. A plurality of openings are provided through the common ground plane at some of the intersections of the input and output signal conductors and such openings are positioned to produce a digitally coded output signal on the output signal conductors when an input signal applied to the input signal conductors crosses such openings.

12 Claims, 4 Drawing Figures

PATENTED FEB 15 1972 3,643,234

HIRO MORIYASU
*INVENTOR*

BY

*BUCKHORN, BLORE, KLARQUIST & SPARKMAN*
*ATTORNEYS*

READ-ONLY MEMORY EMPLOYING STRIPLINES

BACKGROUND OF THE INVENTION

The present invention relates generally to read-only memories for use in electronic computers or other digital signal processing apparatus and, in particular, to such a memory-employing stripline-type transmission lines as the inputs and outputs of the memory. The information is permanently stored in the memory by a plurality of apertures provided through a common ground plane positioned between the input and output signal conductors of such transmission lines, such openings being located in digitally coded positions at some of the intersections of the input and output conductors.

The read-only memory of the present invention has several advantages over conventional inductance memories employing magnetic storage, including much higher operating speeds, on the order of nanoseconds rather than microseconds. In addition, the present read-only memory is simpler and less expensive to manufacture than conventional inductance memories or transistor logic memories so that it is suitable for small production runs. Thus, the read-only memory of the present invention can be used in digital computers or much smaller apparatus, such as a character generator in a cathode-ray oscilloscope to provide switch position readout on the cathode-ray tube of such oscilloscope. The present memory is also of a rugged, reliable, or unitary construction. In addition, production yield of useful commercial memories is extremely high due to the minimum number of elements employed and the fact that such memory can be made with conventional etched circuit board techniques or using integrated circuit processes.

It is, therefore, one object of the present invention to provide an improved read-only memory of extremely high operating speed with a simple and inexpensive construction.

Another object of the invention is to provide such a memory in which stripline-type transmission lines are employed including input and output signal conductors positioned on the opposite sides of a common ground plane, such ground plane being provided with openings therethrough at the intersections of such input and output conductors and such openings being positioned to produce a digitally coded output signal.

An additional object of the present invention is to provide such a memory in which the signal conductors are terminated in the characteristic impedance of their associated transmission lines to prevent signal reflections.

Still another object of the present invention is to provide such a memory which is of extremely rugged, reliable, or unitary construction in the form of an etched circuit board, a multiple-layer metal and glass construction or a semiconductor device, such as an integrated circuit.

A still further object of the invention is to provide such a memory which can be operated to provide a multiple-pulse-series output signal from a sequential pulse-parallel input signal, or may be operated to provide a parallel output signal from a single-pulse-series input signal.

Another object of the invention is to produce such a memory with a single input provided by a delay line, including an input signal conductor wrapped about a second ground plane having no openings therein so that such input conductor crosses each output signal conductor several times to produce a multiple-pulse-series output signal on each output conductor when a single read command input pulse is transmitted through the delay line.

BRIEF DESCRIPTION OF THE DRAWINGS

Other objects and advantages of the present invention will be apparent from the following detailed description of certain preferred embodiments thereof and from the attached drawings of which.

DESCRIPTION OF THE PREFERRED EMBODIMENTS

Figures 1, 2, 3, 4:
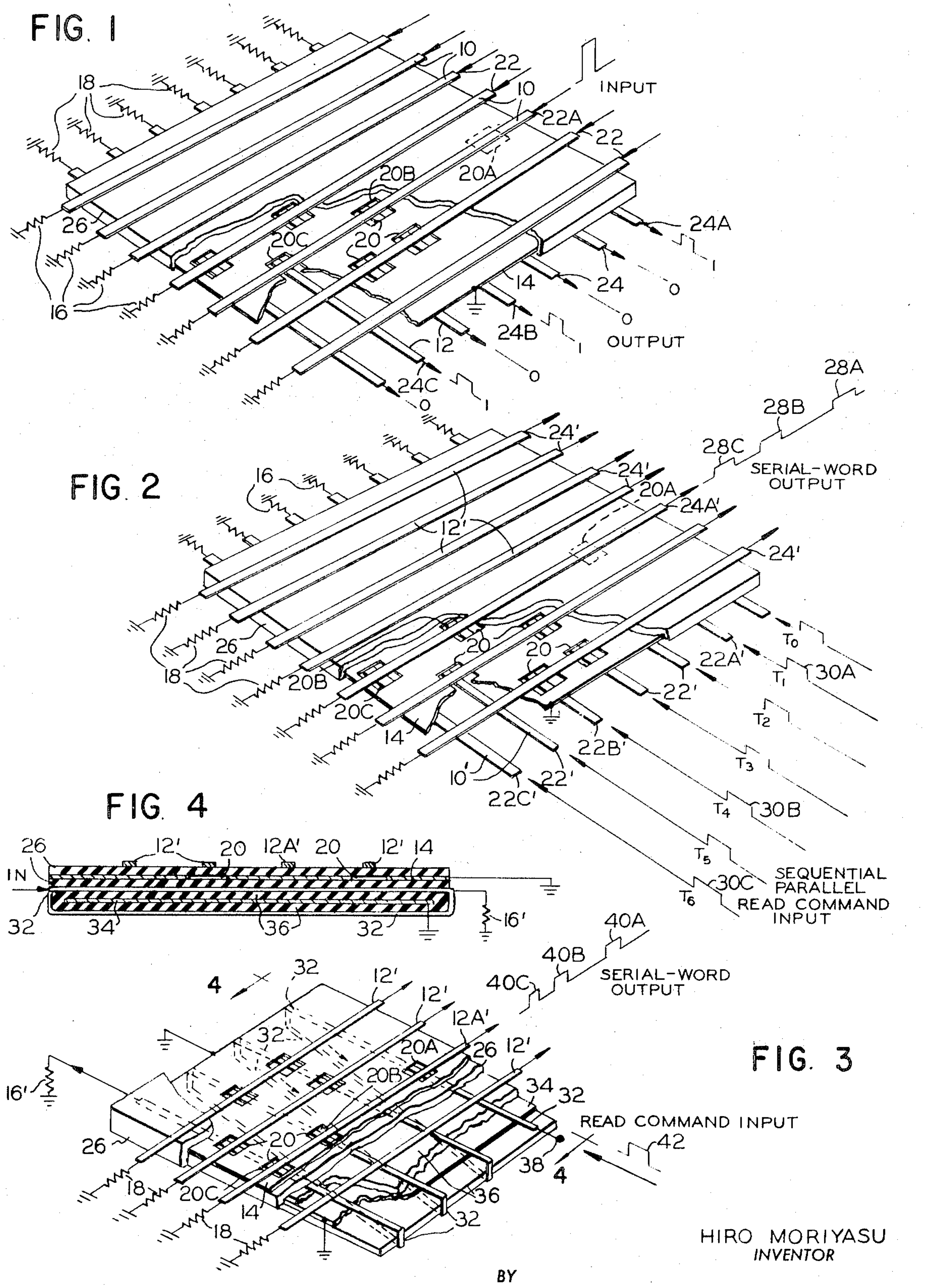
FIG. 1 is a prospective elevation view of one embodiment of the read-only memory of the present invention, with parts broken away for purposes of clarity.
FIG. 2 is a prospective elevation view of another embodiment of the read-only memory of the present invention, with parts broken away for clarity, which is similar to FIG. 1 but is operated so as to provide a series output signal.
FIG. 3 is a prospective elevation view of a third embodiment of the read-only memory of the present invention, with parts broken away for clarity.
FIG. 4 is a section view taken along the line 4—4 of FIG. 3.

As shown in FIG. 1, one embodiment of the read-only memory apparatus of the present invention includes a plurality of first signal conductors 10 and a plurality of second signal conductors 12 provided on opposite sides of a common ground plane conductor 14 with the first and second conductors extending across each other. The first conductors 10 and ground plane 14 form a plurality of first transmission lines, while the second conductors 12 and ground plane 14 form a plurality of second transmission lines, all of such lines having a uniform characteristic impedance. The first signal conductors 10 extend parallel to the ground plane conductor 14 and are uniformly spaced therefrom by the same distance so that all of the first transmission lines have the same characteristic impedance of, for example, 50 ohms. A plurality of first termination resistors 16, each having a resistance equal to the characteristic impedance of the first transmission lines, are connected between the output ends of the first conductors 10 and ground in order to prevent signal reflections in such lines. In a similar manner, the second signal conductors 12 extend substantially parallel to the ground plane conductor 14 and are uniformly spaced the same distance from such ground plane to provide the second transmission lines with the same uniform characteristic impedance of, for example, 50 ohms. A plurality of second termination resistors 18, each having a resistance equal to the characteristic impedance of the second transmission lines, are connected between one end of each second signal conductor 12 and ground to prevent signal reflections within such lines.

The first signal conductors 10 may all extend parallel to each other in a first direction, while the second signal conductors 12 may extend parallel to each other in a second direction which is substantially perpendicular to such first direction. As a result, each of the first signal conductors crosses each of the second signal conductors at intersections. The ground plane conductor 14 is provided with a plurality of openings 20 therethrough which are positioned in alignment with some of the intersections of the first and second signal conductors. The ground plane conductor 14 is electrically connected to ground and serves as an electrostatic shield between the first signal conductors and the second signal conductors, except in those regions having openings 20 therethrough. The ground plane openings 20 are positioned to provide a digitally coded output signal on the second signal conductors 12 when an input signal is applied to the first signal conductors 10.

An input signal pulse applied to the input terminals 22 of the first signal conductors 10 is transmitted down the first transmission line until it crosses a ground plane opening 20. When this happens, a corresponding output pulse is produced on the second signal conductor 12 intersecting the first conductor at such opening. The output pulses are then transmitted through the second transmission lines to the output terminals 24 of the second signal conductors 12 in such line. Thus, in the embodiment of FIG. 1, when a series input signal in the form of a single pulse is applied to input terminal 22A of a first conductor, it produces a corresponding output pulse on output terminal 24A of one second conductor and another output pulse on output terminal 24B of another second conductor, as well as a third output pulse on output terminal 24C of a further second conductor due to the fact that such second conductors intersect the first conductor at openings 20A, 20B and 20C. These output pulses form a parallel output signal which in binary digital code, reading from right to left, is 1001010. Of course, when input pulses are applied to the input terminals of the other first conductors, different parallel output signals are produced.

A layer of electrical insulating material 26 is provided on both sides of the ground plane conductor 14 to electrically insulate such ground plane from the first and second signal conductors and to provide the proper dielectric constant for the desired characteristic impedance of the transmission lines. In one embodiment, the read-only memory of the present invention is formed of an etched circuit board having a central ground plane so that the insulating layers 26 are two epoxy resin impregnated sheets of fiber glass material and the first and second signal conductors 10 and 12 are strips of copper or other suitable metal formed by etching the two metal layers coated on the outer surfaces of such insulator sheets.

In addition, it is also possible to form the read-only memory of a multilayer metal and glass laminate by providing metal coatings on opposite sides of a glass plate to form the ground plane and one of the groups of signal conductors. Then, a second layer of glass is provided over the ground plane and the other group of signal conductors is deposited on the top of such glass layer. Alternatively, it is possible to form the read-only memory of the present invention in a metal-oxide semiconductor device, including an integrated circuit, by depositing the metal layers of the signal conductors and ground plane on layers of semiconductor oxide insulating material. In this embodiment, of course, the termination resistors 16 and 18 are formed as part of the integrated circuit rather than being separate discrete resistors.

Another embodiment of the present invention is shown in FIG. 2 which is very similar to that of FIG. 1 and for this reason the same reference numerals have been employed to designate like parts. In this embodiment, the input signal conductors 10' are positioned on the lower side of the ground plane 14 and the output signal conductors 12' are provided on the upper side of such ground plane. A parallel input signal in the form of a plurality of sequential pulses is applied to the input terminal 22' of the input conductors 10' and produces a multiple pulse series output signal on the output terminals 24' of each output conductor 12'. Thus, the parallel input signal, which is the read command signal of the memory apparatus, produces on the output terminal 24A' of one second signal conductor 12' an output signal which consists of a series of three pulses 28A, 28B and 28C which correspond to input pulses 30A, 30B and 30C applied at times $T_1$, $T_4$, and $T_6$, respectively, to the input terminals 22A', 22B' and 22C'. It should be noted that the embodiment of FIG. 2 is identical to that of FIG. 1 except that a parallel input signal source is employed instead of a series input signal source, and a series output signal is produced on each output terminal rather than a parallel output signal.

A third embodiment of the present invention, shown in FIG. 3, is similar to that of FIG. 2 except that the plurality of input signal conductors 10' have been replaced by a single input signal conductor 32 which is wrapped about an unapertured ground plane conductor 34 to form therewith a signal delay line. This delay line 32, 34 is positioned on the opposite side of the apertured ground plane 14 from the output conductors 12', and such delay line produces output signals on such output conductors in a similar manner to the input signal conductors 10' of FIG. 2. The input signal conductor 32 is insulated from the second ground plane 34 by a layer 36 of insulating material surrounding such ground plane and on both sides thereof. The thickness and the type of insulating material employed for the insulating layers 36 may be the same as that of the insulating layers 26 on opposite sides of the apertured ground plane 14 in order to provide the delay line with the same characteristic impedance as the first transmission line formed by the input signal conductor 32 and the apertured ground plane 14. This enables the termination resistor 16', connected between the output of conductor 32 and ground, to terminate both the delay line and such first transmission line in their characteristic impedance.

As shown in FIG. 4, the input signal conductor 32 wraps entirely about the three-layer "sandwich" formed by the second ground plane 34 and the two insulating layers 36 on opposite sides thereof. The input signal conductor 32 is insulated from the edges of the second ground plane by the insulating layers extending beyond the periphery of such ground plane at least at the edges over which such signal conductor passes. Those portions of the input signal conductor 32 above the second ground plane 34 which cross the output signal conductors 12' at intersections in alignment with the openings 20 in the apertured ground plane 14 produce output pulses on such output signal conductors. Of course, those portions of the input signal conductor 32 below the second ground plane 34 are electrostatically shielded from the output conductors 12' by such second ground plane and, therefore, do not form output pulses.

As a result of employing the delay line 32, 34 in FIG. 3, a single pulse input signal applied to an input terminal 38 of the input signal conductor 32 is transmitted across several ground plane openings 20 in alignment with each output conductor 12' and thereby produces an output signal in the form of a plurality of output pulses on each such output conductor. It should be noted that the time between output pulses in the output signal on a given output conductor is determined by the time delay of the input signal pulse as it is transmitted through that portion of the delay line between successive openings 20 which intersect with such output conductor. For example, output conductor 12A' produces output pulses 40A, 40B and 40C when an input signal pulse 42 transmitted through input conductor 32 reaches the ground plane openings 20A, 20B and 20C, respectively. In most instances, it is desirable to provide the same time delay between successive intersections of the upper portion of the input signal conductor 22 with the same output signal conductor 12' so that any variation in the pulse spacing represents the absence of a ground plane opening at one of such intersections. One such absence of a ground plane opening is illustrated between pulses 40A and 40B in the series output signal of FIG. 3.

As a result of employing stripline-type transmission lines for the inputs and outputs of the memory, an extremely high speed readout operation is obtained, on the order of nanoseconds compared to readout times on the order of microseconds for conventional inductive-type readout memories. This multilayer stripline construction also offers the advantage that several read-only memories can be stacked on top of each other so that two memories can use the same input conductors or the output conductors of one memory can form the input conductors of the next memory. In addition, by employing two apertured ground planes surrounded by two groups of input signal conductors with a single common group of output conductors between the ground planes, an even more complex digitally coded output signal can be produced.

It will be obvious to those having ordinary skill in the art that many changes may be made in the above-described details of the preferred embodiments of the present invention without departing from the spirit of the invention. Therefore, the scope of the present invention should only be determined by the following claims.

I claim:

1. A permanent read-only memory apparatus of unitary construction, comprising:

a fixed common ground plane conductor formed by a sheet of electrically conductive material having a plurality of openings therethrough positioned in a stored information code;

first transmission line means including a plurality of first signal conductors extending in substantially parallel-shaped relationship to said ground plane conductor to form therewith a plurality of first transmission lines of uniform characteristic impedance;

second transmission line means including at least one second signal conductor extending in a substantially parallel spaced relationship to said ground plane conductor to form therewith a second transmission line, and having said second signal conductor positioned on the opposite side of the ground plane conductor from said first signal conductors so that the ground plane conductor extends as a shield between the first and second signal conductors; and support means for electrically insulating said first signal conductors and said second signal conductor from each other and from said ground plane conductor and for supporting said first and second signal conductors and said ground plane conductor as a unitary structure, said second signal conductor having portions extending across said first conductors at a plurality of intersections at least some of which are in alignment with the openings in said ground plane conductor so that an input signal pulse transmitted through said second signal conductor causes an output pulse to be produced on the first signal conductors each time such input pulse is transmitted across one of said openings.

2. A memory apparatus in accordance with claim 1 in which the first transmission line means includes a plurality of first termination resistors each connected between ground and one end of a different one of said first signal conductors, and having a resistance equal to the characteristic impedance of the first transmission line, each of said first transmission lines having only one signal conductor.

3. A memory apparatus in accordance with claim 2 in which the second transmission line means includes a second termination resistor connected between ground and one end of the second signal conductor, and having a resistance equal to the characteristic impedance of the second transmission line.

4. A memory apparatus in accordance with claim 1 in which the openings in the ground plane conductor are positioned to produce a digitally coded output signal on the first signal conductors.

5. A memory apparatus in accordance with claim 1 in which the second transmission line means includes a plurality of second signal conductors forming a plurality of second transmission lines with said ground plane conductor, each of said second signal conductors crossing all of said first signal conductors at a plurality of intersections at least some of which are aligned with the openings in the ground plane conductor.

6. A memory apparatus in accordance with claim 5 which also includes a series input signal means for applying an input signal pulse to one of the second signal conductors and producing a plurality of output pulses on different ones of said first signal conductors to form a parallel output signal.

7. A memory apparatus in accordance with claim 5 which also includes a parallel input signal means for applying a plurality of sequentially timed input pulses to the second signal conductors and producing a plurality of output pulses on at least one of the first signal conductors which form a series output signal.

8. A memory apparatus in accordance with claim 1 in which only one second signal conductor is employed and crosses each of the first signal conductors at a plurality of intersections at least some of which are aligned with said openings.

9. A memory apparatus in accordance with claim 8 which also includes an input signal means for applying an input pulse to one end of the second signal conductor and producing a plurality of output pulses on each first signal conductor to form a series output signal, said output pulses being spaced from each other by the time delays of the second transmission line corresponding to the lengths of the portions of said second line extending between the openings aligned with the first signal conductor on which the series output signal is produced.

10. A memory apparatus in accordance with claim 8 in which the second signal conductor is wrapped in a spiral path about a second ground plane and insulatingly spaced therefrom to form a delay line on the opposite side of the ground plane conductor from the first conductors.

11. A memory apparatus in accordance with claim 10 in which the second signal conductor is connected to ground at its output end through a termination resistor equal to the characteristic impedance of the second transmission line, and the delay line has the same characteristic impedance as said second transmission line.

12. A memory apparatus in accordance with claim 1 in which the insulation means includes at least two layers of insulating material provided on opposite sides of a layer of metal forming the ground plane conductor, and the first and second signal conductors are strips of metal provided on the outer surfaces of said insulating layers.

* * * * *